(12) United States Patent
Kovarik et al.

(10) Patent No.: US 7,841,266 B2
(45) Date of Patent: Nov. 30, 2010

(54) PROXIMITY SENSOR FOR STATIONARY POWER TOOLS

(75) Inventors: Illya Kovarik, Palatine, IL (US); Joseph S. Scaduto, Schaumburg, IL (US)

(73) Assignee: Robert Bosch GmbH, Stuttgart (DE)

( * ) Notice: Subject to any disclaimer, the term of this patent is extended or adjusted under 35 U.S.C. 154(b) by 84 days.

(21) Appl. No.: 11/656,584

(22) Filed: Jan. 22, 2007

(65) Prior Publication Data

US 2008/0173147 A1 Jul. 24, 2008

(51) Int. Cl.
*B26D 7/27* (2006.01)

(52) U.S. Cl. .............. 83/471.2; 83/522.11; 83/522.15; 83/581

(58) Field of Classification Search ............... 83/471.3, 83/58, 62.1, 471, 471.1, 471.2, 477, 491, 83/520, 522.11, 522.12, 522.15, 581, DIG. 1
See application file for complete search history.

(56) References Cited

U.S. PATENT DOCUMENTS

| | | | | |
|---|---|---|---|---|
| 3,785,230 | A * | 1/1974 | Lokey | 30/388 |
| 4,196,648 | A * | 4/1980 | Jones et al. | 83/365 |
| 4,305,006 | A * | 12/1981 | Walthall et al. | 307/38 |
| 4,703,171 | A * | 10/1987 | Kahl et al. | 250/221 |
| 4,851,746 | A * | 7/1989 | Milke | 318/467 |
| 5,081,406 | A * | 1/1992 | Hughes et al. | 318/478 |
| 5,142,199 | A * | 8/1992 | Elwell | 315/154 |
| 5,285,708 | A * | 2/1994 | Bosten et al. | 83/520 |
| 5,778,752 | A * | 7/1998 | Chen | 83/783 |
| 6,742,430 | B2 * | 6/2004 | Chen | 83/520 |
| 7,047,854 | B2 * | 5/2006 | Sako | 83/58 |
| 7,284,335 | B2 * | 10/2007 | Park et al. | 33/286 |
| 2003/0097922 | A1 * | 5/2003 | Chen | 83/520 |
| 2004/0159198 | A1 * | 8/2004 | Peot et al. | 83/62.1 |
| 2004/0221704 | A1 * | 11/2004 | Liu et al. | 83/520 |
| 2006/0101960 | A1 * | 5/2006 | Smith et al. | 83/58 |
| 2006/0101969 | A1 * | 5/2006 | Garcia et al. | 83/477.2 |
| 2006/0213347 | A1 * | 9/2006 | Jan et al. | 83/520 |
| 2006/0225551 | A1 * | 10/2006 | Gass | 83/76.8 |

FOREIGN PATENT DOCUMENTS

| | | |
|---|---|---|
| DE | 201 20 529 | 4/2002 |
| DE | 202 04 305 | 8/2002 |

* cited by examiner

*Primary Examiner*—Boyer D. Ashley
*Assistant Examiner*—Edward Landrum
(74) *Attorney, Agent, or Firm*—Greer, Burns & Crain, Ltd.

(57) ABSTRACT

Embodiments of a power miter saw comprises a saw base having a fence for positioning a work piece, a table rotatably connected to the saw base, a miter arm assembly for angularly positioning the table, a saw blade and motor assembly pivotally connected to the table having a normally elevated rest position and being configured to lower a saw blade toward the table, a handle connected to the saw blade and motor assembly for lowering the saw blade into cutting position, an activation switch adjacent the handle and positioned to be engaged by an operator, a proximity sensor disposed on the saw blade and motor assembly for detecting the presence of objects within a zone of detection associated with the table, and electrical circuitry connected to the proximity sensor configured to generate an electrical detection signal in response to the proximity sensor detecting the presence of an object.

8 Claims, 2 Drawing Sheets

PROXIMITY SENSOR FOR STATIONARY POWER TOOLS

BACKGROUND OF THE INVENTION

This invention relates to power tools, and more specifically, to stationary power tools that have a proximity sensor that detects an object or an operator and triggers some event or action.

Proximity sensors, and particularly infrared sensors are used in many applications and are generally of two types, i.e., those which use a beam that can be interrupted to detect an object or those which detect as a result of reflections of a beam. Reflective object sensors or detectors are used in automatic door openers, occupancy sensors, automatic faucets and hand driers, as examples. The emitter generally continuously outputs a beam of infrared radiation, which is reflected by an object within its range and the reflection is detected to trigger some activity.

SUMMARY OF THE INVENTION

Embodiments of a power miter saw comprises a saw base having a fence for positioning a work piece, a table rotatably connected to the saw base, a miter arm assembly for angularly positioning the table relative to the saw base, a saw blade and motor assembly pivotally connected to the table having a normally elevated rest position and being configured to lower a saw blade toward the table into position to cut a work piece, a handle connected to the saw blade and motor assembly for lowering the saw blade into cutting position, an activation switch adjacent the handle and positioned to be engaged by an operator, a proximity sensor disposed on the saw blade and motor assembly for detecting the presence of objects within a zone of detection associated with the table, and electrical circuitry connected to the proximity sensor configured to generate an electrical detection signal in response to the proximity sensor detecting the presence of an object within the zone of detection.

DETAILED DESCRIPTION OF THE DRAWINGS

DETAILED DESCRIPTION

The preferred embodiment of the present invention is a miter saw that has a proximity sensor to sense an operator in the immediate vicinity and trigger an action or activity, such as illuminating a light of some type, such as a laser for direction one or more lines onto the location where a work piece would be located to indicate the cut line of the miter saw if the saw blade were lowered into cutting position. The width of the laser may be quite narrow and be directed onto one of the edges of a cut line. Alternatively, there may be a pair of spaced apart parallel lines, each of which may be positioned on opposite edges of a cut line. Other actions may comprise turning on a light for illuminating the work area, or initiating the broadcasting of voice warnings, safety or operating instructions, or triggering the operation of other accessories.

While the preferred embodiment described herein is a miter saw that has a proximity sensor, it should be understood that such a proximity sensor could be similarly configured for use in other stationary tools, such as table saws, chop saws, radial arm saws and other cabinet types of tool. Stationary tools as used herein is meant to comprise tools that have a base or support frame of some type that is generally stationary during operation, even though other portions of the tool do move during operation. Such tools are contrasted with hand held tools that usually move in their entirety relative to a work piece or work surface.

The preferred embodiment of the present invention has a manual master switch preferably located near the motor on/off switch which when the master switch is turned on, enables the sensor functionality to operate. With the master switch turned on, the sensor circuitry automatically activates at least one light that is provided on a miter saw when an operator approaches a detection zone associated with the saw. The operator can then concentrate on the work piece without needing to thereafter turn on a separate switch.

Because the sensor circuitry uses almost no power when it is not activated, the manual master switch can realistically be left in its on position. As long as the power plug of the miter saw is plugged into a power source, the sensor circuitry will be operable when an operator enters its zone of detection. Thus, the light or laser is only activated when the tool is being used.

Figure 1:
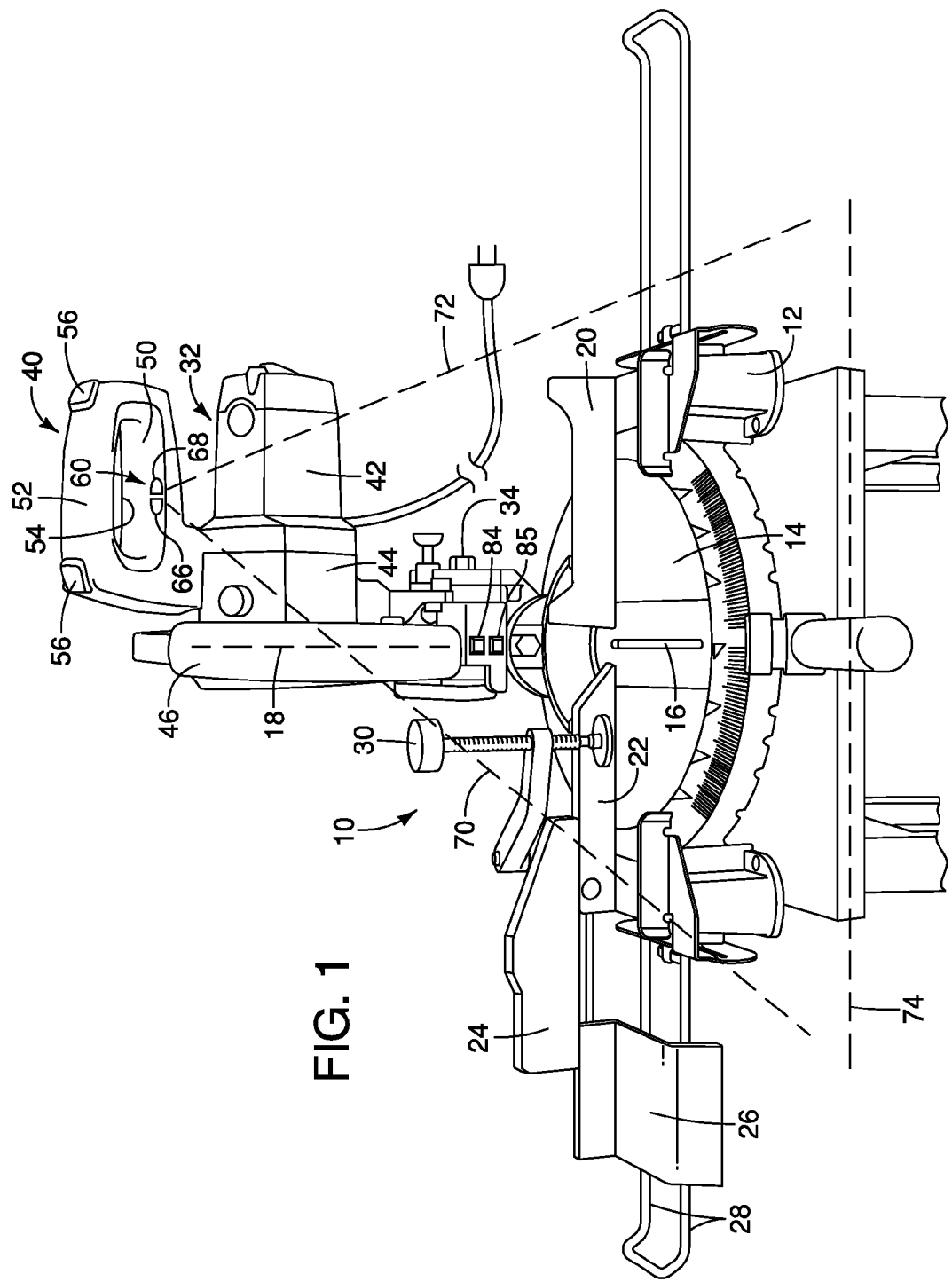
FIG. 1 is a front view of a miter saw which embodies the present invention.

Turning now to the drawings and particularly FIG. 1, a miter saw 10 is illustrated and includes a saw base 12 on which a rotatable table 14 rides, with the table having a slot 16 in which a miter saw blade 18 (shown in phantom) can fit. There is a stationary fence portion 20 attached to the base 12 on one side of the slot 16, and a second stationary fence portion 22 on the opposite side, and an upper fence portion 24 that is slidably attached to the portion 22 and to a table extension 26 that is movable on rails 28. A hold-down clamp 30 can be provided to hold a work piece (not shown) in place during cutting.

The saw 10 also has a saw blade and motor assembly, indicated generally at 32, which is pivotally attached to the table 14 so that it can be lowered from its elevated rest position as shown in FIG. 1 to a cutting position where the blade 18 normally penetrates the slot 16 when cutting a work piece. The assembly 32 is spring biased in its elevated rest position and pivots around a horizontal axis that is perpendicular to the slot 16 in a generally conventionally configured base portion 34, which is also configured to pivot to the left as shown in FIG. 1 about a horizontal pivot axis located generally slightly below the top surface of the table 14 and aligned with the slot 16, to execute bevel cuts on a work piece as is conventional and known to those of ordinary skill in the art. In this regard, it is pointed out that the base portion pivots about the pivot axis.

The assembly 32 has a handle portion, indicated generally at 40, which is preferably integrally formed with a motor housing portion 42, in which the motor is located, and with an intermediate housing portion 44 that in turn is connected to or is formed with a blade guard portion 46. The handle portion 40 has a generally horizontal orientation and has an opening 50 and a front gripping portion 52. A motor trigger switch 54 is located on the inside of the opening 50 and the gripping portion 52. The switch 54 preferably cannot be operated until one of two safety release buttons 56 are depressed which are mechanically interconnected to the switch 54. During a cutting process, an operator normally places the palm of their hand on the top of the gripping portion 52, with their fingers extending through the opening 50 the handle 40 in position to have their thumb depress a safety release button 56 and then squeeze the trigger switch 54 when they wanted the blade to start rotating. The operator can then pull the handle 40 downwardly to engage the blade with a work piece in place.

Figure 2:
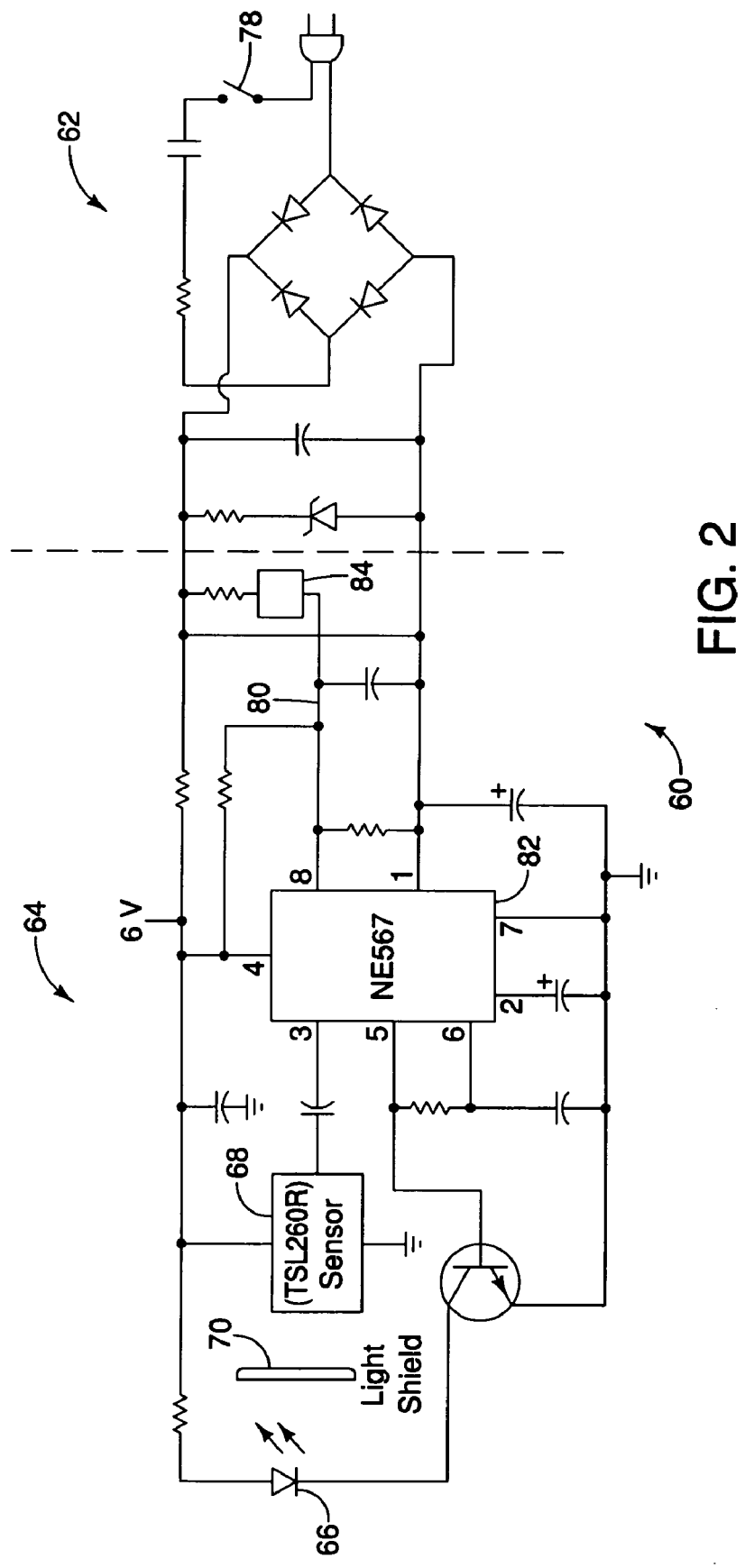
FIG. 2 is a schematic diagram of electrical circuitry used in the saw shown in FIG. 1.

The preferred embodiment of the miter saw includes a sensor unit, indicated generally at 60, that comprise circuitry of which some circuit components are visible in FIG. 1. The sensor unit 60 is shown in FIG. 2 and preferably consists of at least one printed circuit board that includes power supply circuitry 62 that is electrically connected to circuitry 64, the latter of which includes infrared (IR) emitter 66 and IR sensor 68 components. These components 66 and 68 are located in the handle portion rearwardly of the opening 50 and are positioned so that they face toward the general direction in which a person would approach the tool.

The emitter 66 is separated from the sensor 68 by a light shield 70 (see FIG. 2) so that the sensor 68 will not be directly triggered by operation of the emitter 66. The placement of these components in the lower portion of the rear part of the opening 50 enables the emitter to direct the IR emission downwardly toward the front of the saw. As indicated by the dotted lines 70 and 72, the arc of the emission is purposely directed to have a clear line of emission toward open space, i.e., it is necessary that the outer extent or edge of the 70 emission not be reflected by the right edge of the blade guard 46, for example, or by any other portion of the saw, such as the table 14. The circuit parameters can also be adjusted so that the IR emitter 66 characteristics are modified to control the shape and strength of the IR emissions to effectively control the distance from the emitter that encompasses the zone of detection indicated by the dotted line 74. It is preferred that the maximum distance be only a few feet in front of the saw. By adjusting these parameters, the zone in which an operator's presence will activate the sensor can be optimized to prevent nuisance activation.

The sensor circuitry 60 preferably provides a pulsed output that is emitted by the IR emitter 66 at a predetermined frequency so that synchronous detection is used. Only when a reflection at the same predetermined frequency is detected does the sensor produce a desired low output. This prevents ambient and stray infrared radiation from producing false detection signals. The circuit of FIG. 2 provides this type of robust operation.

The sensor circuit 60 is designed to detect an object, such as an operator that approaches the saw 10 to operate it. If the previously discussed master switch, shown at 78 in FIG. 2 which is preferably located on the top of the handle 40 behind the opening 50, then if the sensor circuit 60 detects an operator in front of the saw 10, the circuit will provide an output signal, such as a low signal on output line 80 of integrated circuit 82, which will cause laser 84 to operate.

The laser 84 is also shown mounted on the base portion 34 immediately behind the slot 16 and preferably calibrated to be directed precisely along one or more edges of the cut line that will be made by operation of the saw 10. The sensor circuit is preferably also configured to turn off the laser 84 after a pre-described time period, such as 5-10 seconds, for example, although the time period can be lengthened or shortened. While laser 84 is shown and described, the location of a light 85 for generally illuminating the work area of the saw can be located in the same place, if desired, as is indicated in FIG. 1.

It is understood that reference number 10 can designate any other stationary power tools besides a miter saw as described above wherein such a stationary power tool can also be operated according to the following method: the stationary power tool is at least stationary when it is in use; the stationary power tool is equipped with the activation switch 54 positioned to be engaged by an operator; the proximity sensor 60 is disposed on the stationary power tool for detecting the presence of an operator within the zone of detection associated with the stationary power tool; the electrical circuitry is connected to said proximity sensor and configured to generate an electrical detection signal in response to the proximity sensor detecting the presence of an operator approaching the stationary power tool within the zone of detection before the operator is reaching for the activation switch. This for examples makes it possible to activate the laser or generate another signal which indicates to the operator that the power tool is active thus increasing the safety of the tool because the operator does not have to actually touch the tool.

It is further possible that an electrical signal is generated just before the operator is grasping the handle 40 which comprises the activation switch 54. It is also possible that a light or a display is activated when the operator is getting in some proximity of the stationary power tool and a further accessory such as a laser when the operator is grasping the handle.

The stationary power tool is further equipped with a power cord for connection to a power source, and the proximity sensor is being activated by the electrical circuitry when the power cord is connected to a power source.

The proximity sensor 60 is installed near the switch 54 and is configured to radiate infrared energy into the zone of detection.

A light is connected to a tool and motor assembly of said stationary power tool and configured to direct light onto a work piece supporting surface in response to said detection signal being generated. The light can comprise a light for illuminating the work piece supporting surface so that a work piece is illuminated and is more visible to an operator. The light can comprise a laser for generating a line that is generally coincident with at least a part of a cut line made in a work piece by the blade. The light can also comprise a light for illuminating said work piece supporting surface so that a work piece is illuminated and is more visible to an operator and a laser for generating at least one line that is generally coincident with at least a part of a cut line made in a work piece by the tool. It is specifically advantageous when the light is a laser that gets activated when the operator is approaching the stationary power tool before he or she is actually activating the stationary power tool with the switch 54.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A power miter saw comprising:
   a saw base having a fence for positioning a work piece;
   a table rotatably connected to said saw base, said table having a table surface;
   a miter arm assembly for angularly positioning said table relative to said saw base;
   a saw blade and motor assembly pivotally connected to lower a saw blade toward said table into position to cut a work piece;
   a handle connected to said saw blade and motor assembly for lowering said saw blade into cutting position;
   an activation switch for activating said saw blade and motor assembly adjacent said handle and positioned to be engaged by an operator;
   a proximity sensor disposed on said saw blade and motor assembly for detecting the presence of objects within a zone of detection associated with said table, said zone of detection extending in an angular arc generally from said handle downwardly into free space above and in front of said table a maximum distance of a few feet;

electrical circuitry connected to said proximity sensor configured to generate an electrical detection signal in response to said proximity sensor detecting the presence of an object within said zone of detection; and a light connected to said saw blade and motor assembly and configured to direct light onto said table for providing general illumination of said table surface so that a work piece is illuminated and is more visible to an operator in response to said detection signal being generated and a laser for generating at least one thin visible line that is generally coincident with at least a part of a cut line made in a work piece by the blade.

2. A saw as defined in claim 1 wherein said saw further comprises a power cord for connection to a power source, said proximity sensor being activated by said electrical circuitry when said power cord is connected to a power source.

3. A saw as defined in claim 1 wherein said proximity sensor is installed adjacent said switch and is configured to radiate infrared energy into said zone of detection and to detect reflected energy.

4. A saw as defined in claim 1 wherein said proximity sensor is installed in a portion of said handle and is configured to radiate infrared energy into said zone of detection and to detect reflected energy.

5. A saw as defined in claim 4 wherein said infrared energy is flared outwardly onto said table and into space above and in front of said table, said energy being radiated at a predetermined frequency so that synchronous detection is used, whereby only reflections at the same predetermined frequency are detected to thereby minimize the possibility of ambient and stray infrared radiation producing false detection signals.

6. A saw as defined in claim 4 wherein said infrared energy radiating from said sensor is modulated at a predetermined frequency.

7. A saw as defined in claim 4 wherein said handle has a front gripping portion and an opening rearwardly thereof through which an operator's hand can pass to grip said gripping portion, said sensor is mounted in said handle so that infrared energy is radiated toward said zone of detection from a location that is below said gripping portion.

8. A saw as defined in claim 7 wherein said gripping portion is generally horizontally oriented and said sensor is mounted rearwardly of said gripping portion on the opposite side of said opening.

* * * * *